June 18, 1929.  C. S. COX  1,717,356
COTTON GIN
Filed Feb. 15, 1928  5 Sheets-Sheet 1
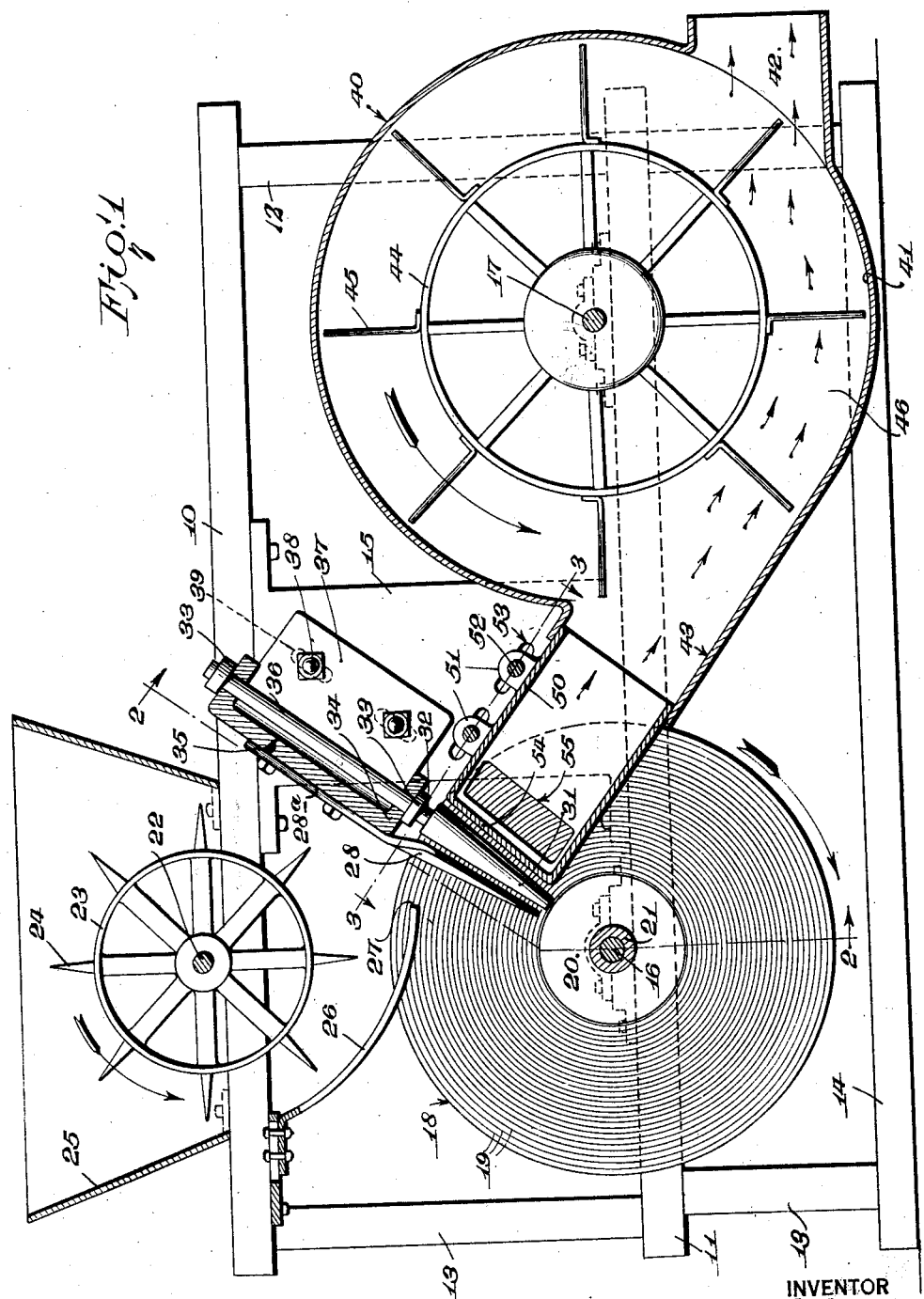
INVENTOR
Cary S. Cox
BY
Munn &Co.
ATTORNEY

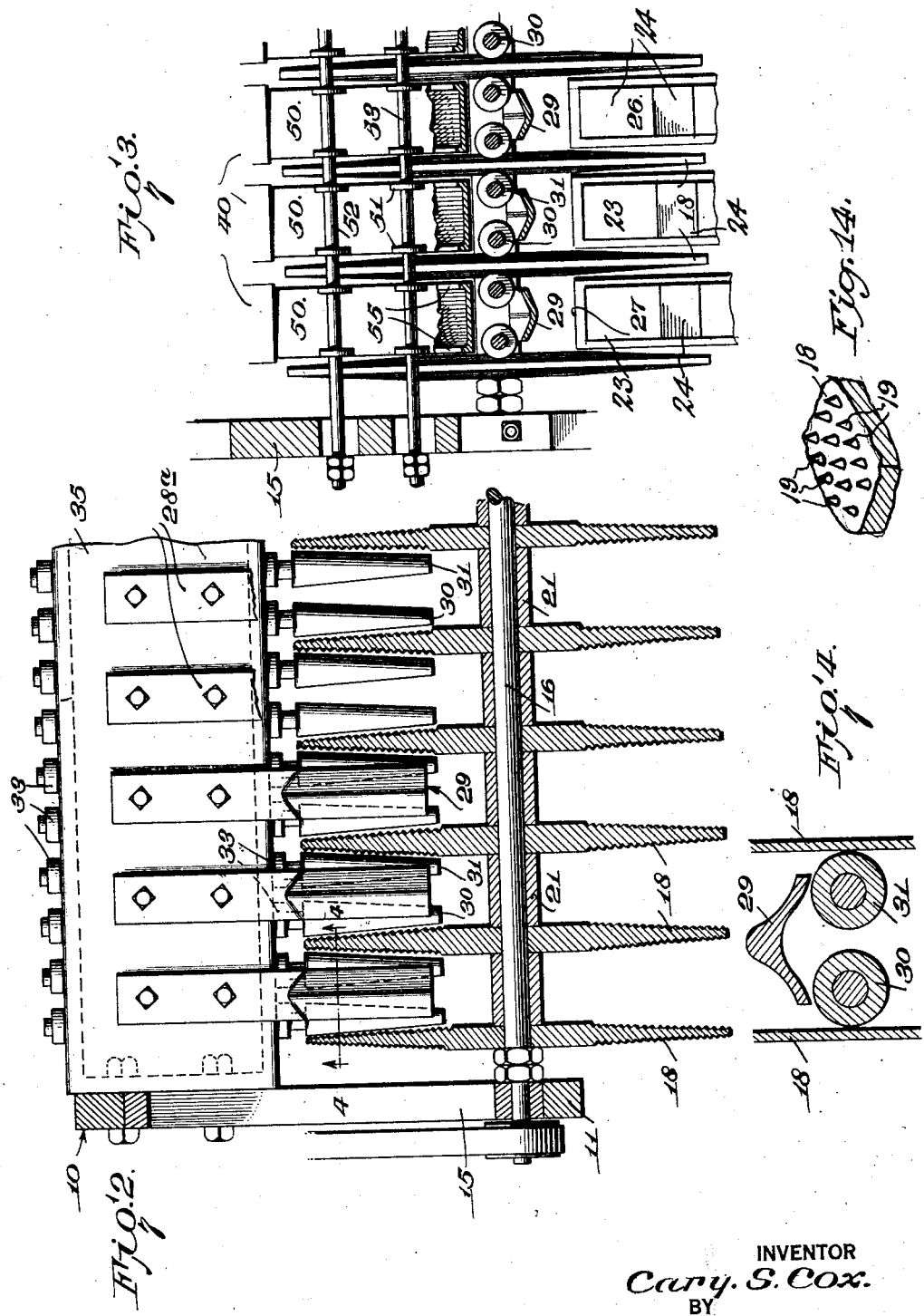

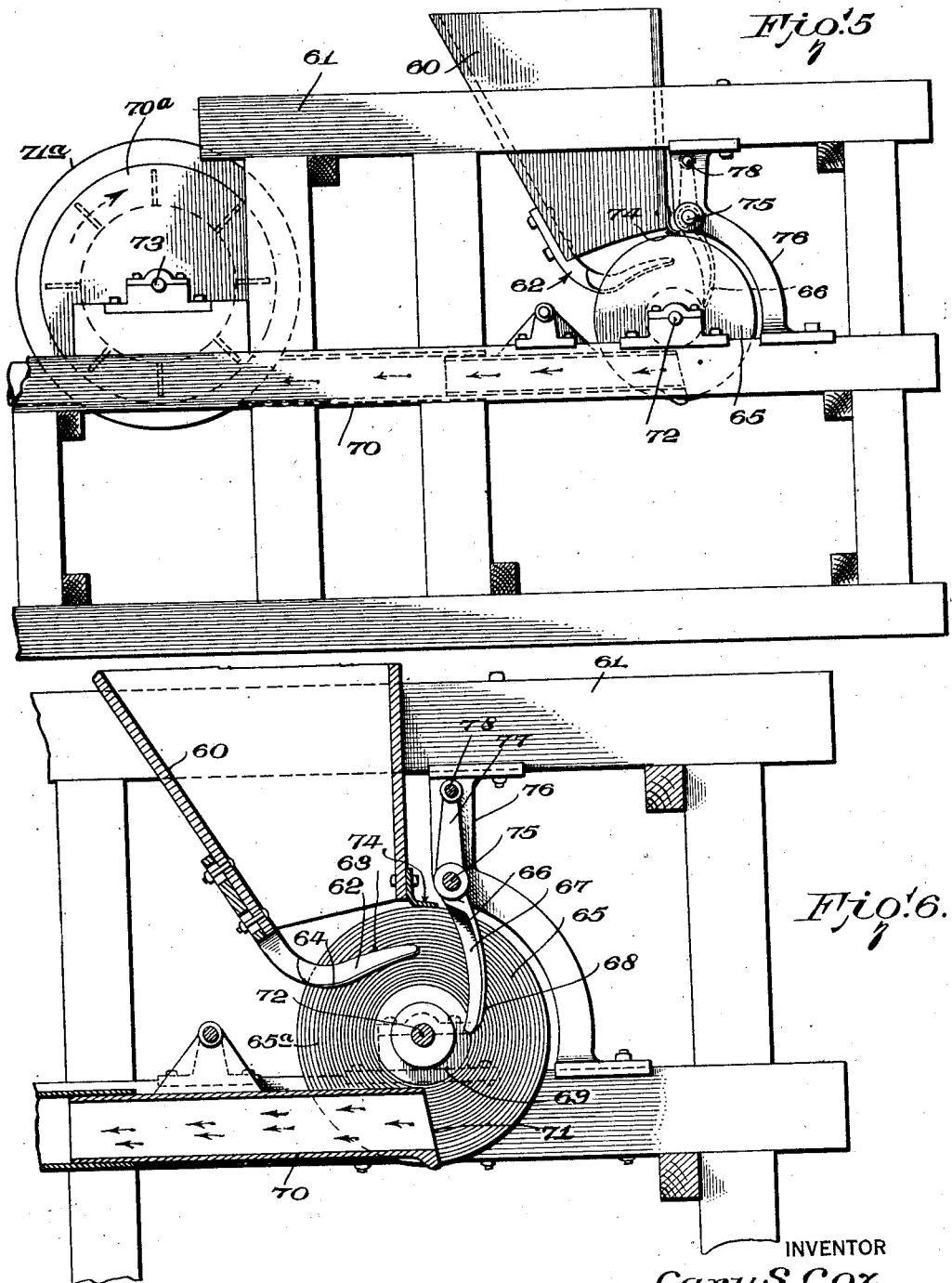

June 18, 1929.  C. S. COX  1,717,356
COTTON GIN
Filed Feb. 15, 1928   5 Sheets-Sheet 4

INVENTOR
Cary S. Cox.
BY
ATTORNEY

June 18, 1929.  C. S. COX  1,717,356
COTTON GIN
Filed Feb. 15, 1928  5 Sheets-Sheet 5

INVENTOR
Cary. S. Cox.
BY
ATTORNEY

Patented June 18, 1929.

1,717,356

UNITED STATES PATENT OFFICE.

CARY S. COX, OF FRESNO, CALIFORNIA, ASSIGNOR OF ONE-THIRD TO JESSIE M. COX AND ONE-THIRD TO FRANCES COX, BOTH OF FRESNO, CALIFORNIA.

COTTON GIN.

Application filed February 15, 1928. Serial No. 254,488.

This invention relates to cotton gins.

An object of the invention is the provision of a gin which will not only remove the lint from the seed but will remove all foreign matter, particularly such matters which are larger than the seeds.

Another object is the provision of a gin in which disks are provided with teeth on the opposite faces thereof cooperating with either seed deflecting bars or tapered roller and deflecting plates whereby the seeds and foreign matter of any size are discharged readily from the gin while the lint is removed by suction applied directly between the toothed disks.

A further object is the provision of a gin including disks having the opposite faces thereof equipped with teeth cooperating with revolving fingers which rotate at a slower speed than the disks and which deflect and maintain the seeds in contact with the toothed disks while the lint is being removed from the seeds.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figures 7, 8, 9:
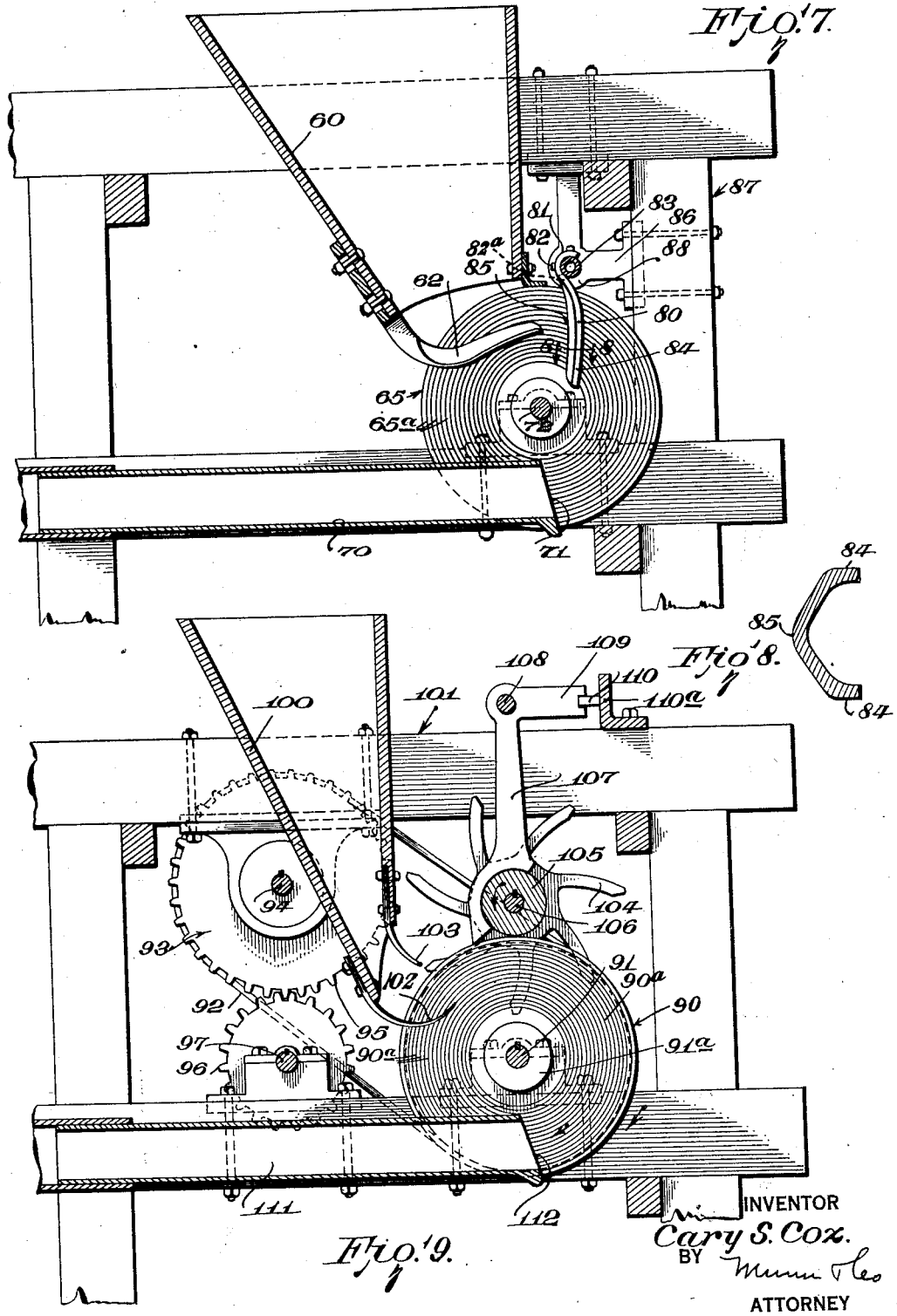
Figure 10:
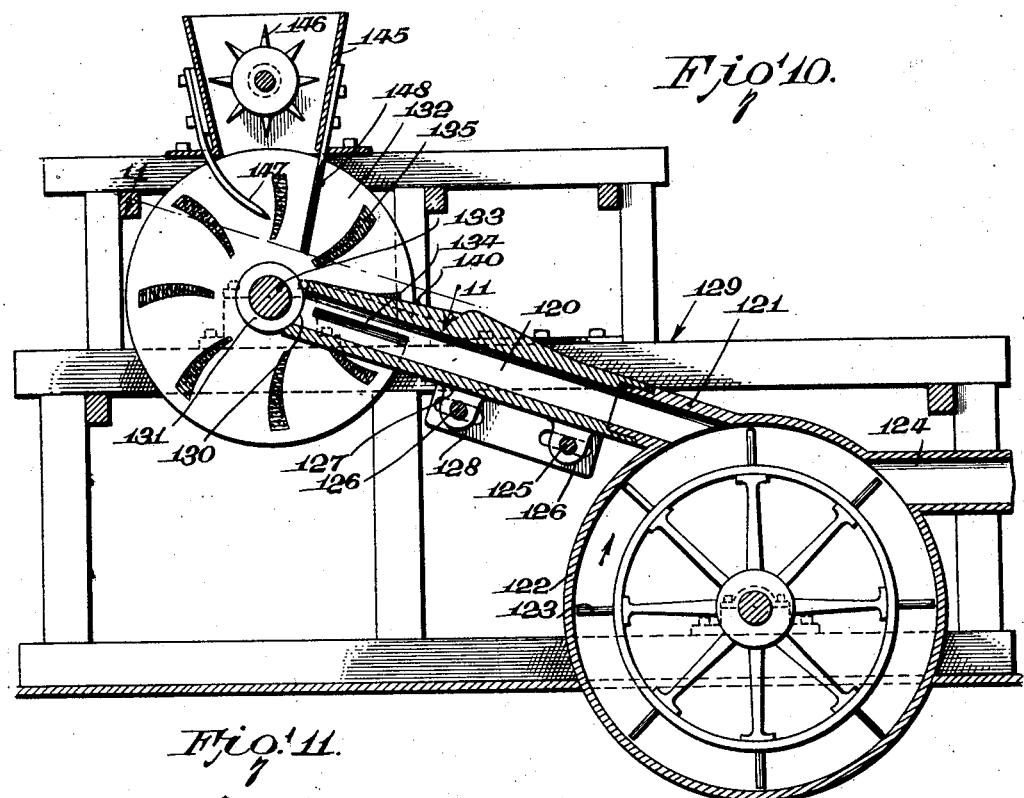
Figures 11, 12:
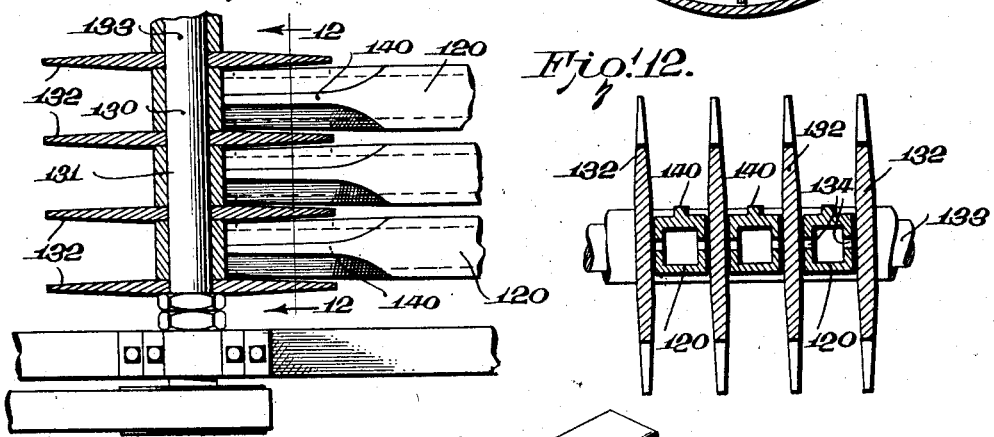
Figure 13:
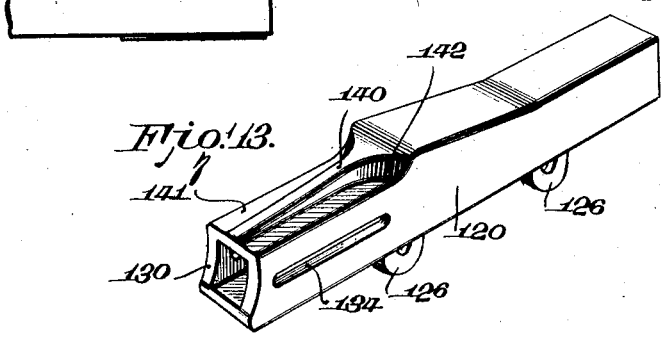

Figure 1 is a vertical section of a cotton gin constructed according to the principles of my invention, Figure 2 is a transverse vertical section taken along the line 2—2 of Figure 1, Figure 3 is a section taken along the line 3—3 of Figure 1, Figure 4 is a horizontal section taken along the line 4—4 of Figure 2, Figure 5 is a longitudinal side view of a modified form of the gin, Figure 6 is a fragmentary longitudinal section of the gin shown in Figure 5, Figure 7 is a fragmentary longitudinal vertical section of a modified form of the device shown in Figures 5 and 6, Figure 8 is a horizontal section taken along the line 8—8 of Figure 7, Figure 9 is a fragmentary vertical section of a further modified form of the gin, Figure 10 is a vertical section of a still modified form of the gin, Figure 11 is a section taken along the line 11—11 of Figure 10, Figure 12 is a vertical section taken along the line 12—12 of Figure 11, Figure 13 is a view in perspective of a combined seed separator and lint removing element.

Figure 14 is a fragmentary view in perspective of a disc shown in any of the figures and illustrating the lint removing teeth.

Referring more particularly to the drawings 10 designates a frame upon which the various elements of the cotton gin are assembled and which is provided with longitudinal beams 11 and standards 12 and 13. These members are supported by a base 14. A plate 15 is secured to the frame in any approved manner, is disposed vertically and connected upon a pair of longitudinal beams of the frame.

A shaft 16 is mounted in bearings on the beams 11 and is spaced from a shaft 17 which is likewise supported in bearings on the frame. A plurality of disks 18 having lint engaging teeth 19 upon their opposite faces are secured in spaced relation on the shaft 16, each face of the disk has a portion 20 adjacent the shaft 16 which is free of teeth and which provides a passage for the discharge of seeds as will be presently explained. The disks 18 are spaced apart by means of sleeves 21 mounted on the shaft 16.

A shaft 22 connected in any suitable manner with the driving mechanism for the shafts 16 and 17 is mounted in bearings on the top of the frame 10. A plurality of drums 23 are secured to said shaft in spaced relation and are provided with a plurality of teeth 24 at the periphery for feeding cotton between the pairs of disks 18. A hopper 25 carried by the frame 10 receives the feeding mechanism. A curved plate 26 is secured to the frame 10 and is located in spaced relation adjacent the lower portion of the feeding mechanism 23 so that as the drum and the teeth 24 are revolved in the hopper 25 it will carry the cotton over the curved plate and force the same off of the free end 27 of said plate and on to the teeth 19 of the disks 18.

A deflecting plate 29 is located between each pair of disks 18 with the inner end of the plate terminating adjacent the outer periphery of the smooth faces 20 of the disks. This deflecting plate is V-shaped in cross section and has its side walls curved for moving the seeds supplied with lint toward the opposite faces of the pairs of disks 18. It is to be noted furthermore that the deflecting plate gradually flattens out from its outer end to the inner end thereof. Each plate 29 is formed integrally with a supporting plate 28ª secured to a bracket 35.

A pair of rollers 30 and 31 are located in spaced relation adjacent to the toothed faces of the disks 18. Each roller is tapered and a face of each disk 18 is inclined to conform to the tapering of the rollers so that the roller will be closely associated throughout its length with the toothed portion of the disk. Each roller is mounted on an axle 32 and which are secured in spaced relation to collars 33 engaging flanges 34 formed integrally with the bracket 35. A sleeve 36 receives the axle 32 and has its opposite ends in engagement with the collars 33. The bracket 35 has an extension or flange 37 carrying bolts 38 adapted to be received within elongated slots 39 formed in the plate 15. These slots are located at an angle to the vertical so that the plate 27 and likewise rollers 30 and 31 may be adjusted toward or away from the shaft 16 when desired.

A housing 40 which is substantially cylindrical in cross section is mounted adjacent the plurality of disks 18 and has a lower curved portion 41 adjacent a discharge opening 42 and an inner opening 43 is provided at a point which is opposite to the discharge opening 42 and adjacent the rollers 30 and 31, or the inner opening terminates adjacent the peripheries of the disk 18.

A fan including a drum 44 and a plurality of radially disposed blades 45 is secured to the axle and is adapted to be revolved in the housing 40 for causing the lint which is collected by the teeth 19 of the disk 18 to be forced through the passage 46 and through the discharge opening 42 where it is collected.

A suction tube 50 has its outer end received within the inlet passage 43 in telescoping relation therewith and is provided with ears 51 carrying bolts 52 which are received within elongated passages or slots 53 formed in the plate 15. By means of the elongated passage in the bolt 52 the suction tube 50 may be adjusted longitudinally of the inlet passage 43 for moving the inner closed end 54 of said tube toward or away from the spaced rollers 30 and 31. The side walls of the tube are provided with elongated openings 55 through which the lint is withdrawn from the teeth 19 of the disk and an opening is provided adjacent each face of a disk. The openings 55 place the interior of the tube 50 in communication with the atmosphere with the openings being adjacent the faces of the discs 18.

The operation of my device is as follows:—

The cotton in a raw state is fed into the hopper 25 which is forced by the teeth 24 over the curved plate 26 and on to the deflecting plate 29 which is located between each pair of disks 18. Since the deflecting plate has its opposite sides inclined the cotton will be discharged directly on to the path of the opposite faces of the disk 18, the deflecting plates preventing the cotton from entering the space between each pair of rollers 30 and 31. The rollers are located adjacent each face of a disk and sufficiently close to the face to cause the rollers to be revolved while preventing seeds and foreign matter from passing between a roller and the face of a disk. While the lint is being engaged by the teeth it is withdrawn by suction through the passages 55 in the tube 50.

The rollers may be covered with a raw hide and the raw hide may be provided with hair which is clipped to provide a length of hair approximating about a one-fourth of an inch, or the rollers may be covered by some composition material suitable for the purpose.

When the lint has been removed from the seeds and foreign matter the lint will no longer aid in maintaining the seeds and foreign matter in position against the side walls of the disks 18 and such matter will travel downwardly and be discharged into the space between the disks and where the disks are devoid of teeth as indicated by the numeral 20. The seeds and foreign matter will therefore fall to the bottom of the device and be directed along a separate or distinct path from that taken by the lint which is removed by suction.

Referring more particularly to Figures 5 and 6 it will be seen that a modified form of the invention is disclosed and in which a hopper 60 is rigidly connected between longitudinal beams 61 and supported thereby. A feeding plate 62 is secured to the lower open end of each hopper and is curved in such a manner that it will extend between each pair of disks 65. The curved member 62 has a central rib 63 which has flaring sides terminating in flanges 64. These flanges are located adjacent the teeth 65ª. A deflecting blade 66 depends downwardly and is located between a pair of the disks 65 and has a longitudinal rib 67 from which extends outwardly and downwardly inclined walls terminating in curved flanges 68. These curved flanges are in close association with the teeth of the disks. It will be noted that the disks are provided with a portion adjacent the center which is devoid of teeth and the free end of the deflecting blade 66 terminates at this portion where the seeds and foreign matter are discharged from the deflecting blade after the lint has been removed from such matter.

Each blade 66 is supported on an axle 75 carried by a bracket 76. An arm 77 is rigid with the blade 66 and it is received by a bar 78 which is adapted to be adjusted radially for varying the position of the blade 66.

A suction tube 70 has an open end 71 which is adjacent the teeth 65ª of the disk 65 so that as the revolving disks pass the open end the lint is withdrawn from the teeth and carried through the tube 70 to a point where it may be collected.

A fan 70 has a housing 71ª in communication with a suction tube 70 for creating a draft in the tube for withdrawing lint from the disks. The revolving fan is driven by a shaft 73 which has an operative connection, not shown, with a shaft 72 upon which the disks 65 are mounted in spaced relation.

A guard 74 is secured to the lower open end of the hopper 60 and opposite the member 62 and is adapted to have its free end in engagement with the top of the disk 65 in order to prevent the lint or raw cotton from being carried over the periphery of said disks and also for removing any lint or foreign matter which may tend to be carried around by said disk.

The raw cotton is fed into the hopper 60 whence it falls upon the plate 62 and is directed laterally toward the teeth 65ª of the disks 65. The revolving disks carry the raw cotton toward the deflecting member 66 where the same is held against further progress and the lint is removed by the teeth. The lint is then carried past the open end 71 of the tube 70 where it is withdrawn by suction. Foreign matter and the seeds pass through the space indicated at 69 between the spaced disks and are then discharged separately from the lint.

The device shown in Figure 7 is similar in all respects to the device shown in Figures 5 and 6 and operates in a similar manner. However, the method of supporting the deflecting blades is modified to a slight extent. In this case the deflecting blade has a curved central and longitudinally disposed rib 85 from which the side walls gradually incline outwardly and terminate in flanges 84. The deflecting blade 80 has a curved portion 81 secured by means of bolts 82 to a rod 83. This rod is supported in a bracket 86 having a bearing 88 to receive the rod 83. The bracket is secured to a strut or vertical beam 87 forming part of the frame of the supporting structure. The rod 83 may be adjusted by means of the bolts 82 projecting through a slot 82ª formed in the curved portion 81 of the blade 80 for varying the position of the deflecting blade 80. It would be appreciated that a number of these deflecting blades are located in spaced relation on the rod 83 with each blade being disposed upon a pair of toothed disks 65.

Referring to Figure 9 it will be seen that a further modified form of the invention shown in Figures 5 to 8 inclusive is illustrated and in which a plurality of toothed disks 90 provided with teeth 90ª at its opposite faces are mounted in spaced relation on a shaft 91 which is revolved in any approved manner.

A belt 92 is trained over a drum 93 rigid with the shaft 94 and a gear 95 is rigid with said shaft and meshes with a gear 96 rigid with a shaft 97. The shaft 97 is driven in any approved manner for causing rotation of the drum 93 and of the shaft 91, said belt 92 being trained over the drum which is also rigid with the shaft 91.

The hopper 100 is supported by a frame 101 and has an open lower end carrying curved plates 102 and 103 with the plate 102 disposed between a pair of disks 90 and in close association therewith to receive the cotton from the hopper and dispose it on to the teeth of said disks.

An axle 105 is located between each pair of disks and is keyed to a shaft 106 which is adapted to rotate idly as will be presently explained. The axle is equipped with a plurality of curved arms 104 which are adapted to move upon a pair of disks and in close association with the same for moving the cotton on to the faces of the disks 90. The axle 105 is supported by means of an arm 107 pivoted at 108 which arm has an extension 109 which has a slot adapted to be engaged by a lug 110 supported by a bracket 110ª. As long as the lug engages the slot in the arm 109 the arm 107 will be maintained in a proper position.

A suction tube 111 has an open end 112 closely associated with the opposite faces of the disks 90 so that it will withdraw the lint from the path of said disks where it may be collected. The disks 90 have a smooth surface adjacent the shaft 91 as shown at 91ª where the seeds and foreign matter are discharged. Since this surface is devoid of teeth the seeds are no longer retained in association with the discs and they fall by gravity onto the top of the suction tube 111.

As the disks 90 are revolved the arms 104 being in close association with said disks will likewise be revolved in a direction which is opposite to the direction of rotation of the disks 90 as indicated by the arrow associated with a hub 105. These arms tend to delay the passage of the foreign matter and seeds until the teeth have removed the lint therefrom. Since the lint retains the seeds and foreign matter in close association with the arms 104 and the disks 90 removal of the lint will release the seeds and foreign matter. Due to the friction of the wear between the revolving discs 30 and the arms 104, said arms being moved thereby will cause rotation of the hub 105.

Referring more particularly to the modified forms shown in Figures 10 to 13 inclusive, it will be seen that a suction tube 120 has a sliding fit with the free end of an inlet tube 121 of a fan housing 122. The fan is generally designated by the numeral 123 and is revolved in a direction indicated by the arrow for creating a suction for withdrawing lint from the teeth of the disks 132, the lint being discharged through the pipe 124.

The tube 120 is provided with a plurality of ears 126 carrying bolts 125 which are received within slots 127 formed in a plate 128 secured to a longitudinal beam 129 of the frame. By this construction the tube 120 is adjustable longitudinally of its axis so that the free end 130 may be moved forward or away from a sleeve 131 mounted on a shaft 133. A suction tube is provided with longitudinal slots 134 in its opposite faces which are located adjacent a face of the toothed disk 132 provided with teeth 135. The disks are rigid with the shaft 133 which is driven in any approved manner.

The upper face of each suction tube 120 has a short rib 140 providing gutters 141 on opposite sides thereof and the rib is curved outwardly as shown at 142 to deflect the seeds and foreign matter away from the upper face of the tube after the lint has been removed by the teeth 135 of the disk.

A hopper 145 is supported by the frame and has a feeding mechanism 146 located therein for progressively forcing the cotton to the faces of the disks and over a blade 147. A deflecting plate 148 is located between each pair of disks 132 and adjacent the free end of the blade 147.

As the cotton is fed through the hopper and on to the teeth of the disk 132 it is carried around by the teeth of the disk and retarded in its movement by the plate 148 until a predetermined quantity of lint is removed. As the foreign matter and seeds move downwardly they are received by the grooves 141 of the suction tube 120 and are finally discharged past the curved members 142. The lint is withdrawn from the teeth and carried through the opening 134 through the suction tube 120 and into the blower 123 whence the lint is discharged through the pipe 124.

I claim:—

1. A cotton gin comprising a plurality of spaced discs having teeth on the opposite faces thereof, means for feeding raw cotton to the faces of the discs, a roller in close association with each face for forcing the cotton into engagement with the teeth and for obstructing travel of the seeds with the discs, each roller having the longitudinal axis thereof disposed radially of the disc, and means for removing the lint from pairs of adjacent faces of the discs.

2. A cotton gin comprising a plurality of spaced discs having teeth on the opposite faces thereof, means for feeding raw cotton to the faces of the discs, a roller in close association with each face for forcing the cotton into engagement with the teeth and for obstructing travel of the seeds with the discs, each roller having the longitudinal axis thereof disposed radially of the disc, means for removing the lint from pairs of adjacent faces of the discs, the rollers being tapered, the reduced ends of each roller being adjacent the center of the discs.

3. A cotton gin comprising a plurality of spaced discs having teeth on opposite faces thereof, means for feeding raw cotton to the faces of the discs at a point adjacent the periphery thereof, rollers contacting with the opposite faces of the discs and revolved thereby, said rollers having their longitudinal axes disposed radially of the discs for forcing the cotton into engagement with the teeth and for obstructing travel of the seeds in conjunction with the discs, and means for removing the lint from pairs of adjacent faces of the discs.

4. A cotton gin comprising a plurality of spaced discs having teeth on opposite faces thereof, means for feeding raw cotton to the faces of the discs at a point adjacent the periphery thereof, rollers contacting with the opposite faces of the discs and revolved thereby, said rollers having their longitudinal axes disposed radially of the discs for forcing the cotton into engagement with the teeth and for obstructing travel of the seeds in conjunction with the discs, means for removing the lint from pairs of adjacent faces of the discs, a portion of the surface of each disc adjacent the center being free of the teeth, the inner free end of each roller terminating adjacent the periphery of the free portion.

5. A cotton gin comprising a plurality of spaced discs having teeth on opposite faces thereof, means for feeding raw cotton to the faces of the discs at a point adjacent the periphery thereof, rollers contacting with the opposite faces of the discs and revolved thereby, said rollers having their longitudinal axes disposed radially of the discs for forcing the cotton into engagement with the teeth and for obstructing travel of the seeds in conjunction with the discs, means for removing the lint from pairs of adjacent faces of the discs, a shield associated with each pair of rollers and co-operating with the rollers for obstructing travel of the seeds along the discs while directing the seeds towards the center to permit discharge of said seeds.

6. A cotton gin comprising a plurality of spaced discs having teeth on the opposite faces thereof, means for feeding raw cotton to the faces of the discs at a point adjacent the periphery thereof, rollers contacting with the opposite faces of the discs and revolved thereby, said rollers having their longitudinal axes disposed radially of the discs for forcing the cotton into engagement with the teeth and for obstructing travel of the seeds in conjunction with the discs, a suction tube having openings adjacent the opposite faces of the discs, and means for adjustably mounting the suction tube whereby said tube may be moved radially towards or away from the center of the discs.

Signed at Fresno, in the county of Fresno and State of California, this 1st day of February, A. D. 1928.

CARY S. COX.